(12) United States Patent
Reichow et al.

(10) Patent No.: US 9,692,988 B2
(45) Date of Patent: Jun. 27, 2017

(54) INFRARED IMAGING PROJECTION (71) Applicant: Disney Enterprises, Inc., Burbank, CA (US)

(72) Inventors: Mark A. Reichow, Valencia, CA (US); Christopher Raynard Runco, Burbank, CA (US); Thomas E. Brentnall, Cypress, CA (US); Thomas Frasier LaDuke, Orange, CA (US)

(73) Assignee: Disney Enterprises, Inc., Burbank, CA (US)

( * ) Notice: Subject to any disclaimer, the term of this patent is extended or adjusted under 35 U.S.C. 154(b) by 516 days.

(21) Appl. No.: 13/863,355

(22) Filed: Apr. 15, 2013

(65) Prior Publication Data
US 2013/0229527 A1 Sep. 5, 2013

Related U.S. Application Data (63) Continuation of application No. 12/187,363, filed on Aug. 6, 2008, now Pat. No. 8,439,503.

(51) Int. Cl.
*H04N 5/33* (2006.01)
*G03B 21/26* (2006.01)

(52) U.S. Cl.
CPC .............. *H04N 5/33* (2013.01); *G03B 21/26* (2013.01)

(58) Field of Classification Search
CPC .......... G03B 21/32; G03B 21/26; H04N 5/33; H04N 5/332; H04N 5/335; H04N 1/32144; H04N 19/467; H04N 21/8358; G06T 1/0021; G06T 1/00
USPC ............. 250/329–336.1, 339.14, 341.8, 342, 250/495.1, 271, 330, 341, 332, 333, 250/338.1, 461.1, 472.1, 492.1; 345/158; 353/28, 30; 348/162, 164
See application file for complete search history.

(56) References Cited

U.S. PATENT DOCUMENTS

| | | | | |
|---|---|---|---|---|
| 5,440,114 | A * | 8/1995 | Barbier et al. | 250/206.2 |
| 6,809,792 | B1 * | 10/2004 | Tehranchi et al. | 352/85 |
| 7,667,198 | B2 * | 2/2010 | Strandemar | 250/330 |
| 8,368,741 | B2 * | 2/2013 | Jelley et al. | 348/14.12 |
| 2004/0080467 | A1 * | 4/2004 | Chinthammit et al. | 345/7 |
| 2009/0268942 | A1 * | 10/2009 | Price | G06K 9/2018 382/103 |

* cited by examiner

*Primary Examiner* — Georgia Y Epps
*Assistant Examiner* — Don Williams
(74) *Attorney, Agent, or Firm* — Patent Ingenuity, P.C.; Samuel K. Simpson (57) ABSTRACT

The subject matter disclosed herein involves systems, methods, apparatuses or devices related to infrared imaging or infrared imaging projection.

19 Claims, 8 Drawing Sheets

INFRARED IMAGING PROJECTION

RELATED APPLICATIONS

This application is a Continuation of U.S. patent application Ser. No. 12/187,363, filed on Aug. 6, 2008, entitled INFRARED IMAGING PROJECTION, which is hereby incorporated by reference in its entirety.

BACKGROUND

Field

The subject matter disclosed herein relates to infrared imaging projection.

Information

Solid state imaging devices, such as digital cameras and camcorders, comprising solid state imaging sensors provide the user with image recording capability that can be used in many ways. Users may now capture images with a quality approaching that of photographic film on relatively affordable devices. The proliferation of portable devices with solid state imaging sensors is extensive. Solid state imaging sensors are found in dedicated digital cameras and camcorders, as well as integrated into other devices such as mobile phones, handheld computers, personal digital assistants and/or the like.

It is becoming commonplace that at least one solid state imaging device is available to or is carried by each person that attends a venue, such as an entertainment complex, theme park, zoo, and museum. The proliferation of solid state imaging devices has impacted revenue generating services normally provided by the venue. For example, a museum may offer for sale photographs of artwork in the form of photo-books and postcards, but a visitor may be able to obtain high duality digital images of the same artwork using a solid state imaging device.

Another noteworthy example is the candid photo service offered at the point of exit of an attraction, especially such as those found at a theme park. It has become commonplace for theme parks to offer keepsake photos of the visitor experiencing, for example, a moment of high excitement on a thrill ride attraction. Upon exiting of the attraction, the visitor may be presented with a high definition display monitor displaying the candid image and an offer for sale of a photo of that image. It is becoming commonplace that instead of the visitor purchasing the candid photo, the visitor is simply capturing the image off of the display monitor using their solid state imaging device.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Countermeasures are needed to prevent the capturing of an image from a display monitor using an imaging device to obtain quality images of high value content.

It is also desired to take advantage of the proliferation of imaging devices to offer a visitor to an entertainment venue an enhanced entertainment experience using such devices.

References are made herein to "infrared image projection installations". Such an infrared image projection installation may comprise any suitable apparatus for projecting infrared light. For example, an optical projector may have a light engine comprising an infrared light emitting source capable of illumination in the infrared spectrum. One such infrared light emitting source may comprise light emitting diodes that illuminate in the infrared spectrum at about 780 nm to about 1200 nm which is outside of the normally visible spectrum and therefore unseen by the unaided eye. An optical projector so equipped may be used for many purposes, such as, but not limited to, to flood an area with infrared light, and to project an image in the infrared spectrum onto a substance.

References are made herein to "solid state imaging devices". In this context, a solid state imaging device is one having a solid state imaging sensor capable of imaging at least a portion of the infrared spectrum. Solid state imaging devices include, such as, but not limited to, digital cameras, digital camcorders, and integrated devices having a solid state imaging sensor, such as mobile phones, portable game consoles, notebook computers, personal digital assistants and/or the like. The solid state imaging sensors may comprise any one of several solid state devices capable of capturing image information, such as, for example, charged-coupled devices (CCDs) and complementary metal-oxide semiconductor (CMOS) devices.

In particular embodiments illustrated herein, infrared illumination may be used to obscure an image displayed on a display monitor as viewed and/or recorded by a solid state imaging device. In a particular embodiment, the quality of an image on a display monitor captured using a solid state imaging device may be degraded so as to discourage capturing the image on a display monitor. According to another embodiment, the image on a display monitor as viewed and/or recorded by a solid state imaging device may be annotated with a message. In these embodiments, the visible aspects of the image on a display monitor are not significantly modified to the unaided eye.

In a particular embodiment, a visitor presents a solid state imaging device having the capability of imaging at least a portion of the infrared spectrum. For instance, such visitor may carry, wear or otherwise be co-located with a solid state imaging device such as, for example, a digital came a digital camcorder, and integrated devices having a solid state imaging sensor, such as a mobile phone, notebook computer, personal digital assistant, and/or the like.

Figure 1:
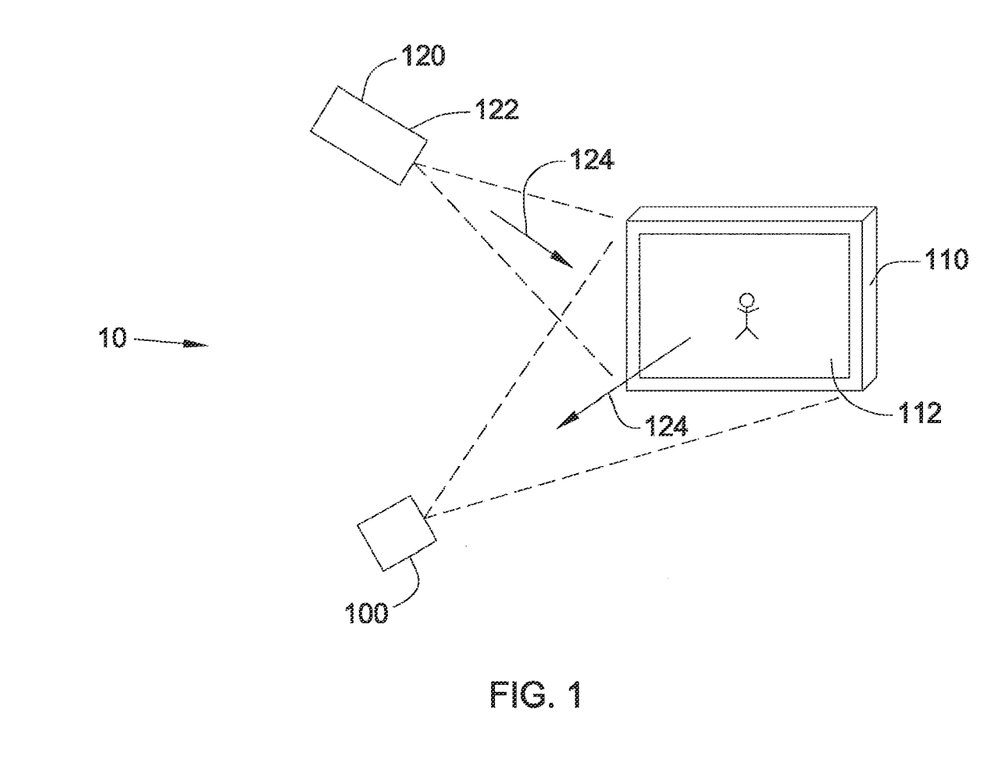
FIG. 1 illustrates a system comprising an infrared projection installation configured to obscure an image on a display monitor as viewed and/or recorded by a solid state imaging device according to an embodiment.

FIG. 1 illustrates system 10 comprising infrared projection installation 122 configured to obscure an image on display monitor 112 as viewed and/or recorded by solid state imaging device 100 according to an embodiment. In the particular implementation of FIG. 1, visitors associated with solid state imaging devices 100 may receive an infrared image, invisible with the unaided eye, reflecting from display screen 112 being illuminated by infrared image projection installation 120. Infrared image projection installation 120 may be installed adjacent display monitor 110 so as to illuminate display screen 112 of display monitor 110 with infrared illumination 124. According to an embodiment, infrared illumination 124 reflected from display screen 112 may be sufficient to at least partially obscure the visible portion of the resulting image as received by solid state imaging device 100 sufficient to render the image undesirable.

Figure 2A:
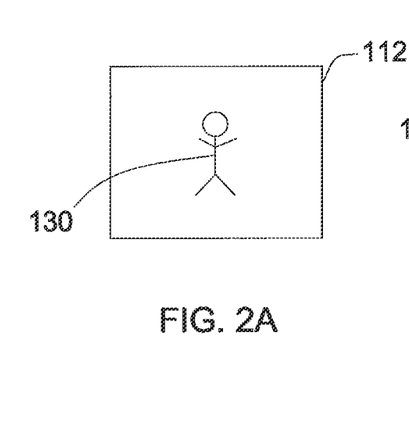
FIGS. 2A-2C illustrate various images by way of example in accordance with embodiments.
Figure 2B:
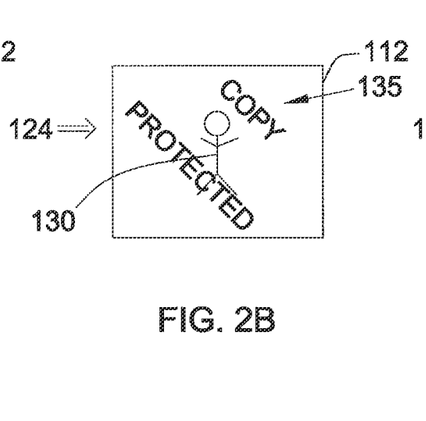

FIGS. 2A-2C illustrate various images by way of example. FIG. 2A illustrates visible image 130 as presented in the visible spectrum. According to an embodiment, infrared illumination 124 reflected from display screen 112 comprises message 135 superimposed onto visible image 130 displayed on display screen 112. Here, such a superimposed message may spoil the resulting image received by solid state imaging device 100 sufficient to render the visible image 130 undesirable, as shown in FIG. 2B. Such a message 135 may state, for example, but is not limited to, "copy protected".

Figure 2C:
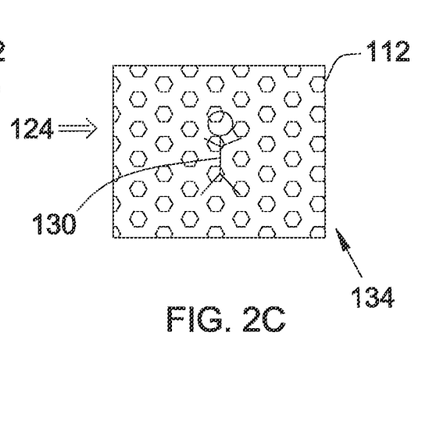

In a particular implementation of FIG. 1, solid state imaging device 100 may receive infrared illumination 124, invisible with the unaided eye, reflecting from display screen 112 of display monitor 110 being illuminated by infrared projection installation 122. Infrared projection installation 122 may be installed adjacent display monitor 110 so as to illuminate display screen 112. According to an embodiment, infrared projection installation 122 may illuminate display screen 112 in sufficient infrared illumination 124 so as to oversaturate pixels of solid state imaging device 100 with infrared energy resulting in an over-exposed, or washed-out image 134, obscuring the visible image 130 sufficient to render the image as received by solid state imaging device 100 undesirable, as illustrated in FIG. 2C. It is noted, in passing, that while this particular embodiment is illustrated as an imaging system, other embodiments may comprise video systems employing infrared projections. Therefore, in the context of this patent application, the term imaging is intended to include video systems and the like.

Figure 3:
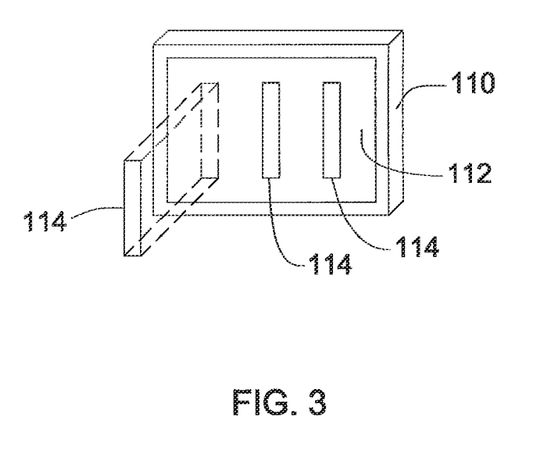
FIG. 3 is an exploded perspective view of a display device in accordance with a particular implementation.

In a particular implementation, display monitor 110 may be modified so as to improve the infrared reflectivity of display screen 112. FIG. 3 is a partially exploded perspective view of display device 110 including overlay 114, in accordance with a particular implementation. In accordance with an embodiment, overlay 114 comprises material having properties that may be reflective of infrared radiation. Overlay 114 may be placed on at least a portion of display screen 112, either permanently or removably coupled thereto. Here, overlay 114 may be sufficiently transparent to the visible spectrum so as not to substantially degrade the visible image that may be shown on display screen 112 as viewed by the unaided eye.

In accordance with an embodiment, overlay 114 may be placed over a particular portion of the display that may show a visible image that may be visible to the unaided eye so as to obscure the visible image if viewed by an imaging device. In accordance with another embodiment, overlay 114 may be placed on the display screen 112 but adjacent to the visible image so as not to necessarily obscure the visible image but, by way of example, not limited thereto, to provide a message.

In accordance with an embodiment, overlay 114 comprises a sheet material including indium tin oxide (ITO). Indium tin oxide is substantially optically transparent to the visible spectrum, substantially reflective in the infrared spectrum, and colorless in thin layers. Thin films of ITO may be deposited on surfaces by electron beam evaporation, physical vapor deposition, and/or sputter deposition techniques, among others. ITO is known to be used to make transparent conductive coatings for liquid crystal displays, flat panel displays, plasma displays, touch panels, electronic ink applications, organic light-emitting diodes, among others.

It is appreciated that the ITO film may be applied to the inside surface of display screen 112, the outside surface of display screen 112, or a part of display screen 112 suitable for the purpose previously described.

In particular embodiments illustrated herein, infrared illumination may be used to spoil an image of an object as viewed and/or recorded by a solid state imaging device. In a particular embodiment, the quality of an image of an object captured using a solid state imaging device may be degraded so as to discourage photographing the object with such an imaging device. According to another embodiment, the image of an object as viewed and/or recorded by a solid state imaging device may be annotated with a message. In these embodiments, the visible aspects of the object are not modified to the unaided eye.

Figure 4:
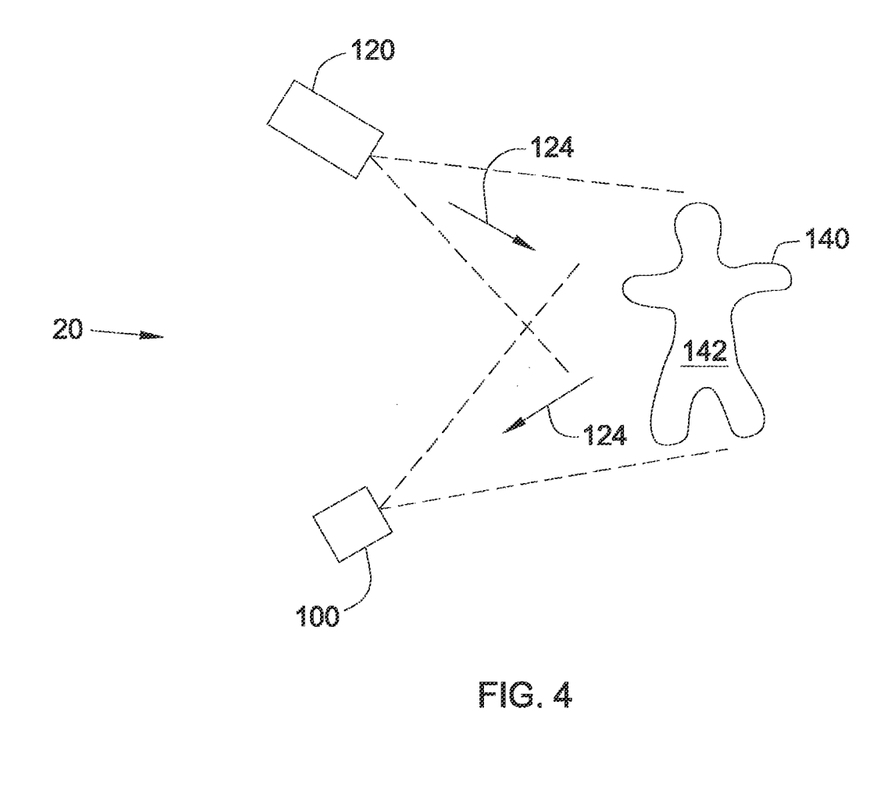
FIG. 4 illustrates a system configured to obscure an image of an object as viewed and/or recorded by a solid state imaging device according to an embodiment.

FIG. 4 illustrates system 20 configured to obscure an image of object 140 as viewed and/or recorded by solid state imaging device 100 according to an embodiment. In the particular implementation of FIG. 4, solid state imaging device 100 may receive infrared illumination 124, invisible with the unaided eye, reflecting from object 140 being illuminated by infrared image projection installation 120. Infrared image projection installation 120 may be installed adjacent object 140 to be illuminated so as illuminate surface 142 of object 140 visible to solid state imaging device 100. According to an embodiment, infrared illumination 124 reflected from object 140 may be sufficient to obscure the visible image as received by solid state imaging device 100 sufficient to render the received image undesirable. According to another embodiment, infrared illumination 124 reflected from object 140 may be a textural or symbolic message that spoils the image received by solid state imaging device 100 sufficient to render the image undesirable. According to an embodiment, the image as received by the solid state imaging device 100 may include an infrared portion comprising a message to appear superimposed onto object 140. Such a message may state, for example, but is not limited to, "copy protected artwork" or "copy protected."

In particular embodiments illustrated herein, visitors carry solid state imaging devices having the capability of imaging at least a portion of the infrared spectrum. For instance, such participants may carry, wear or otherwise be co-located with one or more solid state imaging devices such as, for example, digital cameras, digital camcorders, and integrated devices having a solid state imaging sensor, such as mobile phones, portable game consoles, devices embedded in garments, notebook computers, personal digital assistants and/ or the like. However, in another potential embodiment, an imaging or other device may be adapted to at least partially block infrared light in those instances in which infrared light is to at least partially illuminate an object, such as if the object is illuminated with infrared light immediately before the imaging device is about to capture an image of said object. For example, an imaging device may include an infrared light sensor. If, in such an embodiment, infrared light is detected, the imaging device may, for example, include a mechanism for blocking or otherwise filtering out the infrared light that illuminates the object.

Figure 5:
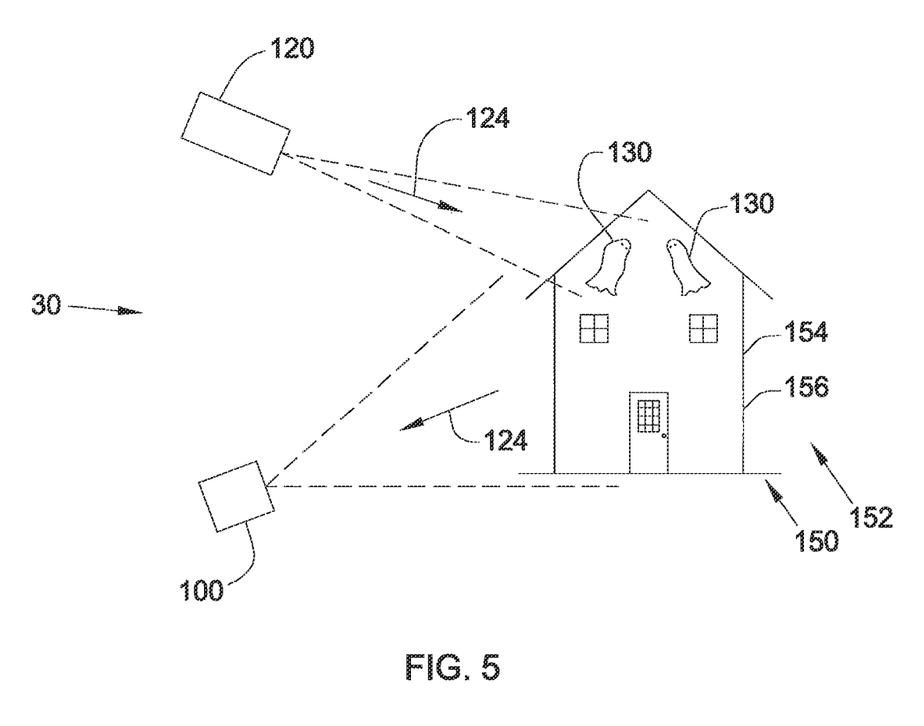
FIG. 5 illustrates a system comprising an infrared image projection installation configured to provide an enhanced experience to visitors according to an embodiment.

FIG. 5 illustrates system 30 comprising infrared image projection installation 120 configured to provide an enhanced experience to visitors according to an embodiment. In the particular implementation of FIG. 5, visitors associated with solid state imaging device 100 may receive infrared images 130, invisible with the unaided eye, at one or more infrared image projection installations 120. Infrared image projection installations 120 may be installed at visual content installation 150. According to an embodiment, visual content installation 150 comprises performance stage 152 and infrared image projection installation 120 may be operable to coordinate the projection of infrared images 130 onto an element of performance stage 152 so as to enhance the visual aspects of performance stage 152 as imaged by solid state imaging device 100. According to an embodiment, a visitor may view infrared image 130 superimposed onto visual content installation 150 using the solid state imaging device 100.

In a particular example provided for the purpose of illustration, infrared image projection installation 120 may be positioned adjacent visual content installation 150 that provides visual content 154 to those without solid state imaging device 100. Infrared image projection installation 120 projects infrared image 130 onto at least a portion of visual content installation 150 to provide additional visual content to the visitor viewing visual content installation 150 with solid state imaging device 100. For example, in visual content installation 150 representing a haunted house (e.g., as in a theme park attraction), infrared image projection installation 120 may project infrared image 130 representing a ghost onto the haunted house such that the visitor may view the ghost using solid state imaging device 100. Infrared image 130 may comprise a moving image of a ghost, a still image of text message or symbol, among other things, and/or combinations thereof.

Figure 6:
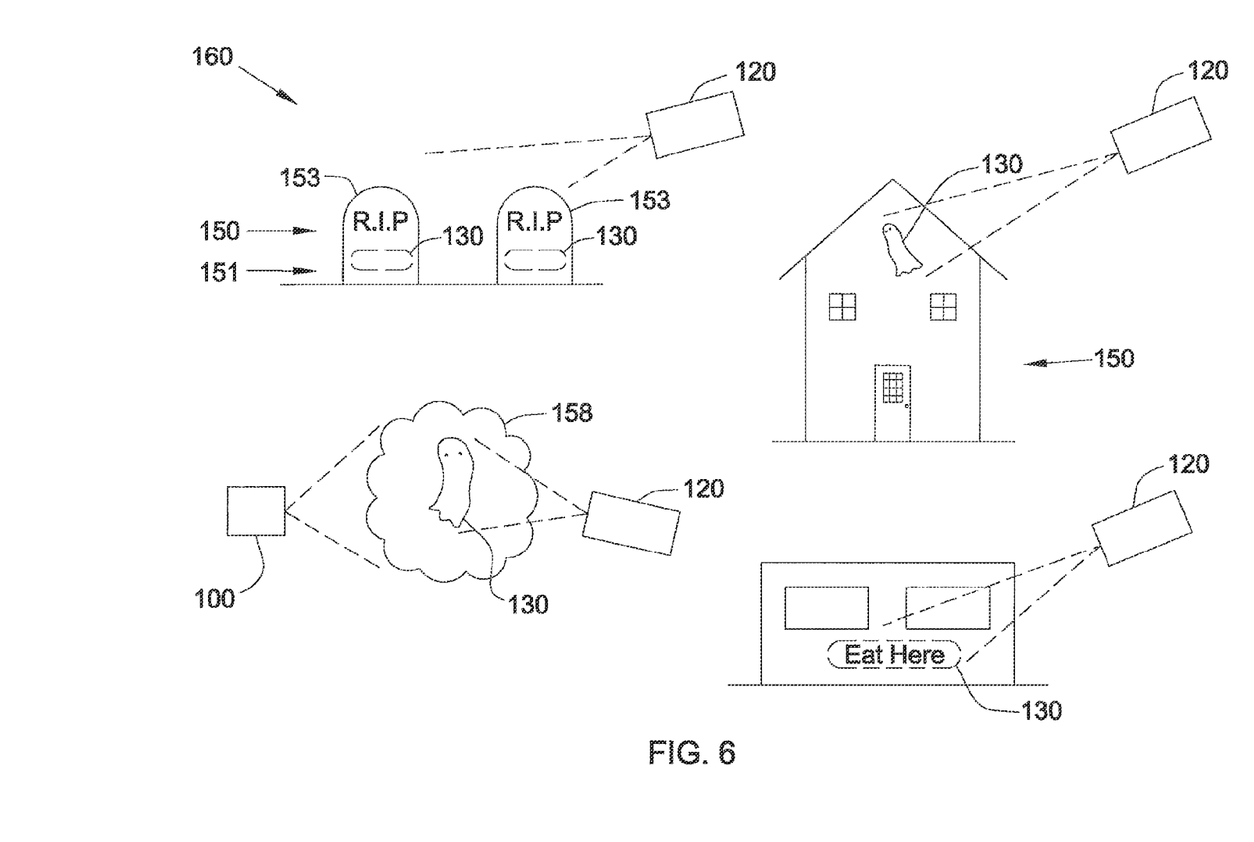
FIG. 6 is a schematic of a gaming environment in accordance with an embodiment.

FIG. 6 is a schematic of gaming environment 160 in accordance with an embodiment. In particular embodiments illustrated herein, participants in an interactive game may carry solid state imaging devices 100 having the capability of capturing images in at least a portion of the infrared spectrum. For instance, such participants may carry, wear or otherwise be co-located with one or more solid state imaging devices such as, for example, digital cameras, digital camcorders, and integrated devices having a solid state imaging sensor, such as mobile phones, portable game consoles, devices embedded in garments, notebook computers, personal digital assistants and/or the like.

In particular embodiments illustrated herein, participants in an interactive game may physically move about in gaming environment 160 to search for clues. For instance, such participants may visualize infrared images 130 using solid state imaging devices 100.

A game participant may participate in a game having an object of the game being, for example, completing tasks and/or performing actions in gaming environment 160. Such a participant may, for example, in an embodiment, participate in a game objective by locating a predefined number of a plurality of infrared images 130, with the challenge of finding the most infrared images 130 in a predetermined period of time.

According to an embodiment, gaming environment 160 may provide an interactive gaming experience to one or more "game participants" ("game participant" is to be used interchangeably herein with "participant"). In one particular embodiment a game participant may compete with another participant in finding the most infrared images 130 in a predetermined period of time, and/or to get to a destination the quickest based on finding clues in the infrared images 130, for example, among others.

Referring again to FIG. 6, gaming environment 160 comprises one or more infrared image projection installations 120 configured to provide a gaming experience to participants according to an embodiment. In the particular implementation of FIG. 6, game participants associated with solid state imaging devices 100 participate in a gaming experience at one or more infrared image projection installations 120. Infrared image projection installations 120 may be dispersed over a geographical area such as that of a theme or amusement park. In other embodiments infrared image projection installations may be dispersed over a geographical area such as a neighborhood, school or business campus, convention center, theatre complex, town, metropolitan area, political subdivision such as a city, state or nation, just to name a few examples.

According to an embodiment, a game participant may travel to different infrared image projection installations 120 while carrying solid state imaging device 100 to visualize an infrared image 130 and participate in a gaming experience having an objective, at least in part, on finding a plurality of infrared images 130, "invisible" to the unassisted eye, viewable with the assistance of the participant's solid state imaging device 100. According to another embodiment, the participant records each infrared image 130 onto the solid state imaging device 100 so as to verify at a later time that indeed the infrared image 130 was seen.

According to an embodiment, a gaming experience includes finding a plurality of infrared images 130, such as, but not limited to, in the form of text, still image, moving image, symbol and the like, including combinations thereof. According to another embodiment, a gaming experience further includes solving a puzzle which may be solvable by correctly answering or solving a series of riddles or problems based on the found images. According to another embodiment, gaming experience includes locating a plurality of infrared images 130 in a predetermined sequence to provide directions to a destination.

Infrared image projection installations 120 may exist at a fixed location in game environment 160, or may be mobile such that its position changes during game play. Infrared image projection installation 120 may be manned or unmanned. In an embodiment, infrared image projection installation 120 may be integrated with a character costume. In an embodiment, infrared image projection installation 120 may be integrated with a themed structure. In an embodiment, infrared image projection installation 120 may be integrated with a water feature 158, such as a mist generator or pond such that infrared image 130 appears to be floating in midair or on or underwater, respectively. It is appreciated that the infrared image 130 may reflect from a variety of infrared reflective media, such as, but not limited to, mist, smoke, water, screen, netting, wall, flat substrate, non-flat substrate, and film.

In a particular example provided for the purpose of illustration, infrared image projection installation 120 may be positioned adjacent a visual content installation 150 that provides visual content to those not viewing the visual content installation 150 with the assistance of solid state imaging device 100. Infrared image projection installation 120 may project infrared image 130 onto at least a portion of visual content installation 150 to provide additional visual content to the participant viewing visual content installation 150 with solid state imaging device 100. For example, where visual content installation 150 represents graveyard 151 comprising a plurality of tombstones 153, infrared image projection installation 120 may project infrared image 130 of a ghost onto tombstone 153 such that the participant may view the ghost using solid state imaging device 100. Infrared image 130 may comprise a moving image of a ghost, a still image of text message or symbol or graphic, among other things, and/or combinations thereof.

According to an embodiment, the number of infrared images 130 viewed and recorded on solid state imaging device 100 may be evaluated by an attendant to provide a reward for finding a predetermined number of infrared images 130. The reward may be any desirable benefit, such as, but not limited to, a prize. According to another embodiment, the value of the reward is dependent on meeting one of a plurality of objects of the game.

In particular embodiments illustrated herein, infrared illumination may be used to obscure an image displayed on a display monitor as viewed and/or recorded by a solid state imaging device. In a particular embodiment, the quality of an image on a display monitor captured using a solid state imaging device may be degraded so as to discourage photographing the image on a display monitor. According to another embodiment, the image on a display monitor as viewed and/or recorded by a solid state imaging device may be annotated with a message. In these embodiments, the visible aspects of the image on a display monitor are not modified to the unaided eye.

In a particular embodiment, a visitor or participant presents a solid state imaging device having the capability of imaging at least a portion of the infrared spectrum. For instance, such visitor or participant may carry, wear or otherwise be co-located with a solid state imaging device such as, for example, a digital camera, digital camcorder, and integrated devices having a solid state imaging sensor, such as a mobile phone, notebook computer, personal digital assistant, and/or the like.

Figure 7:
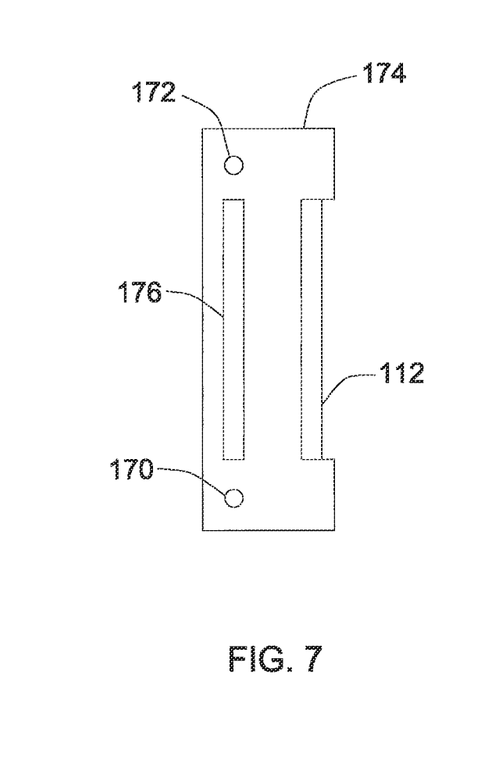
FIG. 7 is a side cross-sectional view of a display monitor comprising a back light visible spectrum illumination source, an infrared spectrum illumination source, a diffuser, and a display screen according to an embodiment.

FIG. 7 is a side cross-sectional view of display monitor 174 comprising a back light visible spectrum illumination source 170, infrared spectrum illumination source 172, diffuser 176, and display screen 112, configured to obscure an image on display monitor 174 as viewed and/or recorded by a solid state imaging device 100 according to an embodiment. In the particular implementation of FIG. 7, a solid state imaging device may receive infrared images, invisible with the unaided eye, emanating from display screen 112.

Figure 8:
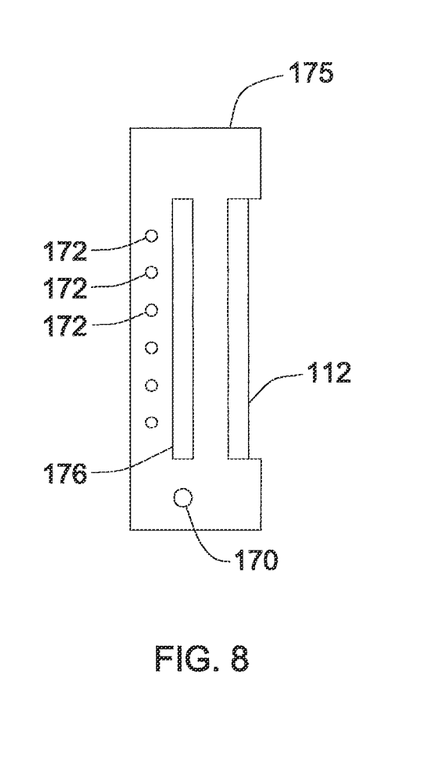
FIG. 8 is a side cross-sectional view of a display monitor comprising a back light visible spectrum illumination source, a plurality of infrared spectrum illumination sources, a diffuser, and a display screen according to an embodiment.

FIG. 8 is a side cross-sectional view of display monitor 175 comprising a back light visible spectrum illumination source 170, a plurality of infrared spectrum illumination sources 172, diffuser 176, and display screen 112, configured to obscure an image on display monitor 175 as viewed and/or recorded by a solid state imaging device according to an embodiment. The plurality of discrete infrared illumination sources 172 are located behind display screen 112 and operable so as to project infrared illumination through display screen 112 that may be imaged by a solid state imaging device. Discrete infrared illumination sources 172 may be uniformly arranged relative to the display screen 112 so as to oversaturate the pixels of a solid state imaging device with infrared energy; that is, to over expose the resulting image sufficient to render the image as received by a solid state imaging device undesirable. According to another embodiment, discrete infrared illumination sources 174 may be preferentially arranged so as to form a text message, a distorting pattern, a symbol, and/or other resulting image sufficient to render the image as received by a solid state imaging device undesirable.

Figure 9:
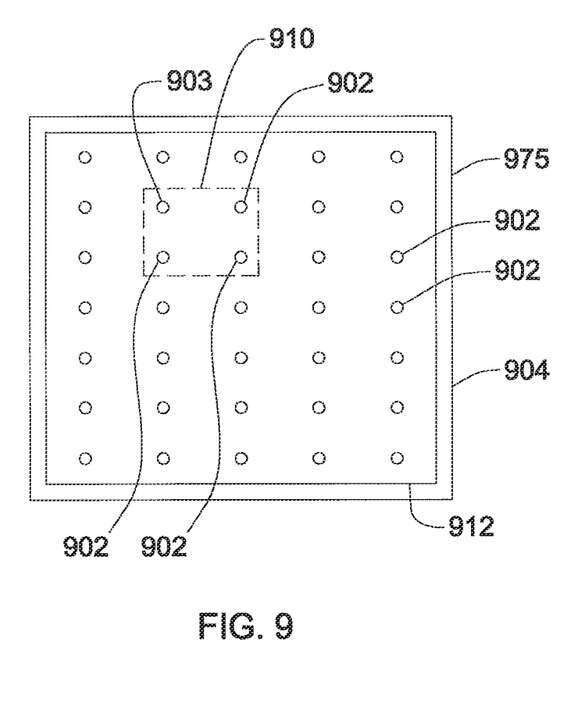
FIG. 9 is a front view of an embodiment of LED display comprising a panel and a plurality of light emitting diodes.

FIG. 9 is a front view of an embodiment of LED display 975 comprising a panel 904 and a plurality of light emitting diodes (LED) 902. Individual LEDs 902 may be coupled to panel 904 in a predetermined arrangement. By way of example, pixel 910 comprises a predetermined number of LEDs 902. Pixel 910 may include any combination of red, green, or blue colored LEDs 902. In an embodiment, pixel 910 further comprises infrared (IR) LED 903. IR LED 903 is an LED operable to emit infrared radiation. In an implementation of LED display 975, a predetermined number of IR LEDs 903 may be arranged in a predetermined arrangement suitable for a particular purpose.

By way of example and explanation, LED display 975 may comprise LEDs 902 arranged on panel 904 having a 30 mm pitch with a 4-red/3-green/3-blue LEDs 902 per pixel 910. This provides over 130,000 pixels 910 from a total of more than 650,000 LEDs 902. LED display 975 may provide a full-color, video capability. LED display 975 may comprise a range of sizes and formats suitable for, but not limited to, indoor shopping malls, off-road billboard displays, or bus shelters. In other embodiments, LED display 975 may be provided as network-capable, multi-sign configurations.

In an implementation of LED display 975, a plurality of IR LEDs 903 may be arranged so as to provide image copy protection. In a particular implementation, IR LEDs 903 may be uniformly arranged on panel 904 so as to distort or obscure the resulting image produced by LEDs 902 sufficient to render the image undesirable as received by a solid state imaging device. According to another implementation, IR LEDs 903 may be preferentially arranged so as to form a text message, a distorting pattern, a symbol, or other resulting image as received by a solid state imaging device. The text message, distorting pattern, symbol, or other resulting image may render the image undesirable as received by solid state imaging device.

According to yet another implementation, IR LEDs 903 may be preferentially arranged so as to form a text message, a symbol, or other resulting image that may be enjoyed when viewed by a solid state imaging device.

In accordance with an embodiment, LED display 975 further comprises an IR light diffuser 912. IR light diffuser 912 may be operable to diffuse infrared light so as to soften or blur together the IR light from individual IR LEDs 903 as viewed from a side of IR light diffuser 912 opposite from IR LEDs 903. IR light diffuser 912 may be placed in close proximity to IR LEDs 903 so as to blend the points of IR light together to make a fuzzy infrared image, particularly suitable, for example, for images of ghosts. By way of an example of an implementation, LED display 975 may be placed in a window of a building such as a haunted mansion in a theme park so as to present an image of a ghost as received by a solid state imaging device.

In yet another implementation, IR light diffuser 912 may also be operable for use as a projection screen so as to provide, by way of example, a projected scene as viewed with the unaided eye that is augmented with an IR image as received by a solid state imaging device.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

We claim:

1. A method for augmenting a recorded appearance of an object, the method comprising:
    illuminating the object with visible spectrum illumination;
    illuminating the object with infrared spectrum illumination, wherein the infrared spectrum illumination contains imagery; and
    capturing an augmented image of the object, wherein the augmented image of the object comprises both a visible image of the object and a visible image of the imagery contained in the infrared spectrum illumination.

2. The method of claim 1, wherein the imagery contained in the infrared spectrum illumination comprises a symbol.

3. The method of claim 1, wherein the imagery contained in the infrared spectrum illumination comprises texture.

4. The method of claim 1, wherein the imagery contained in the infrared spectrum illumination comprises text.

5. The method of claim 1, wherein the imagery contained in the infrared spectrum illumination comprises a message.

6. An apparatus for augmenting a recorded image of a scene, the apparatus comprising:
    an infrared image projector that illuminates the recorded image with infrared spectrum illumination that contains imagery such that the recorded image reflects the imagery to produce an augmented recorded image, the recorded image also being illuminated by a visible spectrum illumination source, the augmented recorded image of the object comprising both a visible image of the object and a visible image of the imagery contained in the infrared spectrum illumination.

7. The apparatus of claim 6, wherein the imagery contained in the infrared spectrum illumination comprises a symbol.

8. The apparatus of claim 6, wherein the imagery contained in the infrared spectrum illumination comprises texture.

9. The apparatus of claim 6, wherein the infrared image projector is integrated with a character costume.

10. The apparatus of claim 6, wherein the imagery contained in the infrared spectrum illumination comprises a message.

11. The apparatus of claim 6, wherein the infrared image projector is integrated with a water feature.

12. The apparatus of claim 6, wherein the imagery contained in the infrared spectrum illumination comprises text.

13. A system for augmenting a recorded image of a scene, the system comprising:
    an infrared image projector that illuminates the recorded image with infrared spectrum illumination that contains imagery such that the recorded image reflects the imagery to produce an augmented recorded image, the augmented recorded image of the scene comprising both a visible image of the scene and a visible image of the imagery contained in the infrared spectrum illumination; and
    an image capture device that captures the augmented image of the scene.

14. The system of claim 13, wherein the imagery contained in the infrared spectrum illumination comprises a symbol.

15. The system of claim 13, wherein the imagery contained in the infrared spectrum illumination comprises texture.

16. The system of claim 13, wherein the infrared image projector is integrated with a character costume.

17. The system of claim 13, wherein the infrared imagery contained in the infrared spectrum illumination comprises a message.

18. The system of claim 13, wherein the infrared image projector is integrated with a water feature.

19. The system of claim 13, wherein the imagery contained in the infrared spectrum illumination comprises text.

* * * * *